(12) United States Patent
Zhang (10) Patent No.: US 11,644,677 B2
(45) Date of Patent: May 9, 2023

(54) HOOKING DEVICE OF VR DATA CABLE

(71) Applicant: SHENZHEN HONGJIANTOU TECHNOLOGY CO., LTD, Shenzhen (CN)

(72) Inventor: Zhinan Zhang, Shenzhen (CN)

(73) Assignee: SHENZHEN HONGJIANTOU TECHNOLOGY CO., LTD, Shenzhen (CN)

(*) Notice: Subject to any disclaimer, the term of this patent is extended or adjusted under 35 U.S.C. 154(b) by 382 days.

(21) Appl. No.: 17/042,152

(22) PCT Filed: May 25, 2020

(86) PCT No.: PCT/CN2020/092129
§ 371 (c)(1),
(2) Date: Sep. 27, 2020

(87) PCT Pub. No.: WO2021/103446
PCT Pub. Date: Jun. 3, 2021

(65) Prior Publication Data
US 2021/0165232 A1  Jun. 3, 2021

(30) Foreign Application Priority Data
Nov. 28, 2019  (CN) .......................... 201922114839.9

(51) Int. Cl.
*B65H 75/48* (2006.01)
*G02B 27/01* (2006.01)
(Continued)

(52) U.S. Cl.
CPC ......... *G02B 27/0176* (2013.01); *B65H 57/26* (2013.01); *B65H 75/446* (2013.01); *B65H 75/4449* (2013.01); *B65H 75/48* (2013.01)

(58) Field of Classification Search
CPC ...... B65H 57/26; B65H 75/48; B65H 75/446; B65H 75/4449; G02B 27/0176
See application file for complete search history.

(56) References Cited

U.S. PATENT DOCUMENTS 4,014,478 A * 3/1977 Bonacina .................. B63C 9/26
                                                    242/381.3
4,132,372 A * 1/1979 Worrell ............... B65H 49/327
                                                    242/129.62
(Continued)

FOREIGN PATENT DOCUMENTS

| CN | 208774604 U | 4/2019 |
|---|---|---|
| CN | 209264772 U | 8/2019 |

OTHER PUBLICATIONS

International Search Report and Written Opinion in corresponding PCT Application No. PCT/CN2020/092129, dated Sep. 1, 2020.

*Primary Examiner* — Sang K Kim
(74) *Attorney, Agent, or Firm* — Westbridge IP LLC (57) ABSTRACT

Disclosed is a hooking device of a VR data cable, configured to hang the VR data cable, including a buffer, a hang assembly, and an adjustment assembly. The buffer is hung on a hook of a ceiling. The hang assembly is configured to hang the VR data cable. One end of the adjustment assembly is connected to the buffer, and the other end of the adjustment assembly is connected to the hang assembly, and the adjustment assembly adjusts a hang height of the VR data cable through elastic expansion and contraction.

14 Claims, 4 Drawing Sheets

(51) Int. Cl.
*B65H 75/44* (2006.01)
*B65H 57/26* (2006.01)

(56) References Cited

U.S. PATENT DOCUMENTS

| | | | | |
|---|---|---|---|---|
| 5,209,420 A | * | 5/1993 | Simmons | H02G 11/02 |
| | | | | 242/406 |
| 5,918,831 A | * | 7/1999 | Floyd, Sr. | B65H 49/22 |
| | | | | 242/129 |
| 8,757,532 B2 | * | 6/2014 | Votel | B65H 75/48 |
| | | | | 242/378 |
| 2013/0249778 A1 | * | 9/2013 | Morimoto | G02B 27/0176 |
| | | | | 345/8 |
| 2013/0345029 A1 | | 12/2013 | Hao | |

* cited by examiner

HOOKING DEVICE OF VR DATA CABLE

CROSS-REFERENCE TO RELATED APPLICATIONS

This application is the National Stage of International Application No. PCT/CN2020/092129, filed on May 25, 2020, which claims the benefit of Chinese Patent application No. 201922114839.9, filed on Nov. 28, 2019 and entitled "Hooking Device of VR Data Cable", the entirety of which is hereby incorporated herein by reference.

FIELD

This application relates to the technical field of cable storage devices, and in particular to a hooking device of a VR data cable.

BACKGROUND

A VR headset (virtual reality head-mounted display device) is a device that closes the user's vision and hearing from the outside world, and guides the user to produce a feeling of being in a virtual environment. When using a VR headset to play a VR game, it is necessary to use a VR data cable to connect the VR headset to the game terminal device. VR data cables are usually scattered around the user. When using a VR headset, the user's vision and hearing of the outside world are closed and it is difficult to notice the location of the VR data cable and whether the VR data cable is entangled or not. In order to prevent users from tripping over the VR data cable, the VR data cable may be hung on the ceiling with a pull wire, but using the pull wire to hang the VR data cable will restrict the movement of the VR data cable, making it inconvenient for users to use the VR headset.

SUMMARY

The main purpose of this application is to provide a hooking device of a VR data cable, which aims to make the movement of the VR data cable more convenient after being hung, so that the user may use the VR headset more conveniently.

In order to achieve the above purpose, a hooking device of a VR data cable provided in this application is configured to hang the VR data cable, and includes: a buffer, hung on a hook of a ceiling; a hang assembly, configured to hang the VR data cable; and, an adjustment assembly, one end of the adjustment assembly being connected to the buffer, the other end of the adjustment assembly being connected to the hang assembly, a hang height of the VR data cable being adjusted through elastic expansion and contraction of the adjustment assembly.

In an embodiment, the adjustment assembly includes a pull wire and a spiral elastic piece. The pull wire includes a straight section and a winding section. One end of the elastic piece located at a spiral center is connected to the buffer, and the other end of the elastic piece is connected to the winding section. The winding section is spirally wound on an outer circumference of the elastic piece. One end of the straight section is connected to an end of the winding section away from the elastic piece, and the other end of the straight section is connected to the hang assembly.

In an embodiment, a storage box is provided outside the elastic piece and the winding section. The end of the elastic piece located at the spiral center is fixed in the storage box. The buffer is fixed on the storage box. The straight section is extended out of the storage box from an end of the storage box away from the buffer.

In an embodiment, the straight section is sleeved with a sleeve, and a side wall of the sleeve defines a threaded hole penetrating one side wall of the sleeve. The threaded hole is provided with a matching bolt, and the bolt is configured to be screwed into the threaded hole to abut the straight section against the other side wall of the sleeve.

In an embodiment, the buffer is V-shaped and combined with the storage box to define a hooking space configured to be hooked to the hook.

In an embodiment, the hang assembly includes an adapter and a hang member. The adapter is connected to the straight section. A shaft core is penetrated through the adapter. One end of the shaft core extending out of the adapter is provided with a stopper, and the other end of the shaft core extending out of the adapter is provided with a clamping block. The hang member includes a first end and a second end. The first end is sleeved on a part of the shaft core between the stopper and the adapter. The second end defines a clamping hole, and the second end is configured to be bent to define a hooking hole between the hang member and the adapter, then the clamping block is configured to be elastically clamped into the clamping hole to sleeve the second end on a part of the shaft core between the clamping block and the adapter.

In an embodiment, the second end defines a plurality of clamping holes spaced apart along a length direction of the hang member.

In an embodiment, the buffer, the adjustment assembly and the hang assembly are sequentially connected to form one hooking group. A number of the hooking group is at least two. The buffer of one of the at least two hooking groups is hooked on the hang assembly of others of the at least two hooking groups. The hang assembly of the one of the at least two hooking groups is configured to hang the VR data cable, and the buffer of the others of the at least two hooking groups is hung on the hook of the ceiling.

In an embodiment, the buffer hooked on the hang assembly of the others of the at least two hooking groups is a first buffer section, and the buffer hooked on the hook of the ceiling is a second buffer section; the adjustment assembly directly connected to the first buffer section is a first adjustment section, and the hang assembly directly connected to the first adjustment section is a first hang section; the adjustment assembly directly connected to the second buffer section is a second adjustment section, and the hang assembly directly connected to the second adjustment section is a second hang section; and a number of the second buffer section, a number of the second adjustment section, and a number of the second hang section are multiple and equal, the multiple second buffer sections are hung on hooks of the ceiling at intervals, and the first buffer section is simultaneously connected with the multiple second hang sections.

In an embodiment, the number of the second buffer section, the number of the second adjustment section, and the number of the second hang section are all three, three second buffer sections are hung on the hooks of the ceiling in a triangular distribution, and the first buffer section is simultaneously connected with the multiple second hang sections.

In the technical solution of this application, the VR data cable is hung on the ceiling by the hang assembly and the buffer, so that when the user uses the VR headset, the VR data cable is not easy to fall on the ground and cause problems such as entanglement. In addition, the hang height of the VR data cable is adjusted by elastic expansion and contraction of the adjustment assembly, so that the hung VR data cable may be moved more conveniently, thereby making it more convenient for users to use the VR headset.

BRIEF DESCRIPTION OF THE DRAWINGS

In order to more clearly describe the technical solutions in the embodiments of this application or related art, the following will briefly introduce the drawings that need to be used in the description of the embodiments or related art. Obviously, the drawings in the following description are only some embodiments of this application. For those of ordinary skill in the art, without creative work, other drawings can be obtained according to the structures shown in these drawings.

The realization, functional characteristics, and advantages of the purpose of this application will be further described in conjunction with the embodiments and with reference to the accompanying drawings.

DETAILED DESCRIPTION OF THE EMBODIMENTS

The technical solutions in the embodiments of this application will be described clearly and completely in conjunction with the drawings in the embodiments of this application. Obviously, the described embodiments are only a part of the embodiments of this application, but not all the embodiments. Based on the embodiments in this application, all other embodiments obtained by those of ordinary skill in the art without creative work shall fall within the protection scope of this application.

It should be noted that if there is a directional indication (such as up, down, left, right, front, back . . . ) in the embodiment of this application, the directional indication is only used to explain the relative positional relationship, movement conditions, etc. among the components in a specific posture (as shown in the drawings), if the specific posture changes, the directional indicator also changes accordingly.

In addition, if there are descriptions related to "first", "second", etc. in the embodiments of this application, the descriptions of "first", "second", etc. are for descriptive purposes only, and cannot be understood as indicating or implying their relative importance or implicitly indicating the number of indicated technical features. Thus, the features defined as "first" and "second" may include at least one of the features either explicitly or implicitly. In addition, the meaning of "and/or" in the full text means that it includes three parallel schemes. Taking "A and/or B" as an example, it includes scheme A, scheme B, and a scheme in which both A and B meet. In addition, the technical solutions between the various embodiments can be combined with each other, but they must be based on the ability of those skilled in the art to realize. When the combination of technical solutions conflicts with each other or cannot be realized, it should be considered that the combination of such technical solutions does not exist, nor within the scope of protection required by this application.

This application provides a hooking device of a VR data cable 60, which is configured to hang the VR data cable 60.

Figure 1:
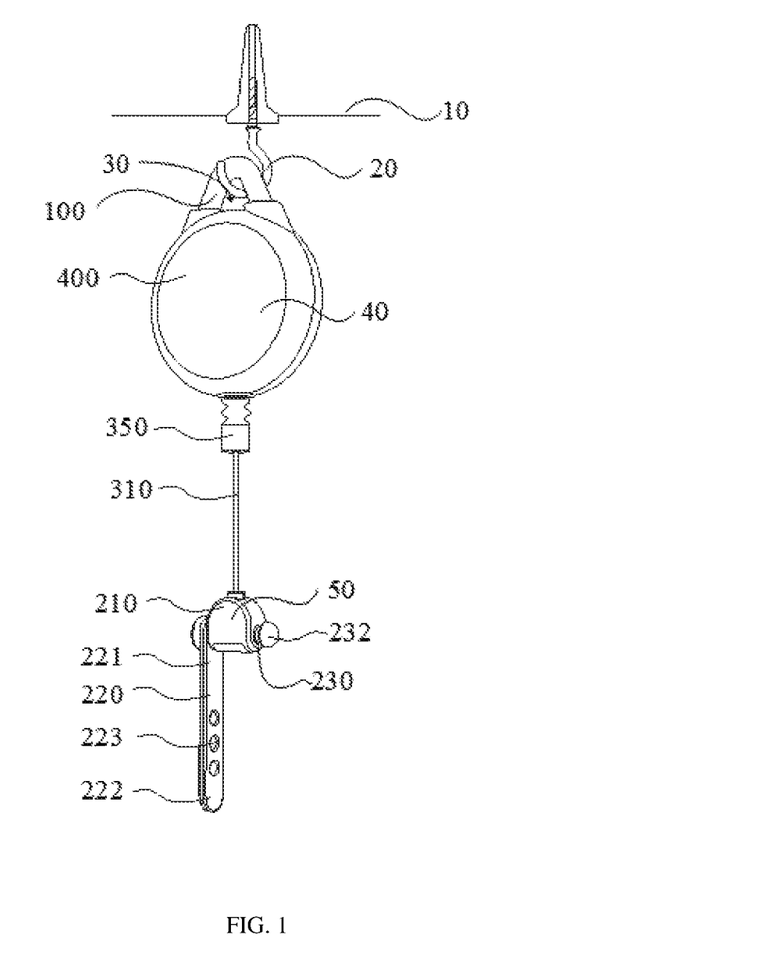
FIG. 1 is a schematic structural diagram of a hooking device of a VR data cable according to an embodiment of this application.

In an embodiment of this application, as shown in FIG. 1, the hooking device of the VR data cable 60 includes a buffer 100, a hang assembly 50 and an adjustment assembly 40. The buffer 100 is hung on a hook 20 of a ceiling 10. The hang assembly 50 is configured to hang the VR data cable 60. One end of the adjustment assembly 40 is connected to the buffer 100, and the other end of the adjustment assembly 40 is connected to the hang assembly 50, and, the adjustment assembly 40 adjusts a hang height of the VR data cable 60 through elastic expansion and contraction.

In the technical solution of this application, the VR data cable 60 is hung on the ceiling 10 by the hang assembly 50 and the buffer 100, so that when the user uses the VR headset, the VR data cable 60 is not easy to fall on the ground and cause problems such as entanglement. In addition, the hang height of the VR data cable 60 is adjusted by elastic expansion and contraction of the adjustment assembly 40, so that the hung VR data cable 60 may be moved more conveniently, thereby making it more convenient for users to use the VR headset.

Figure 2:
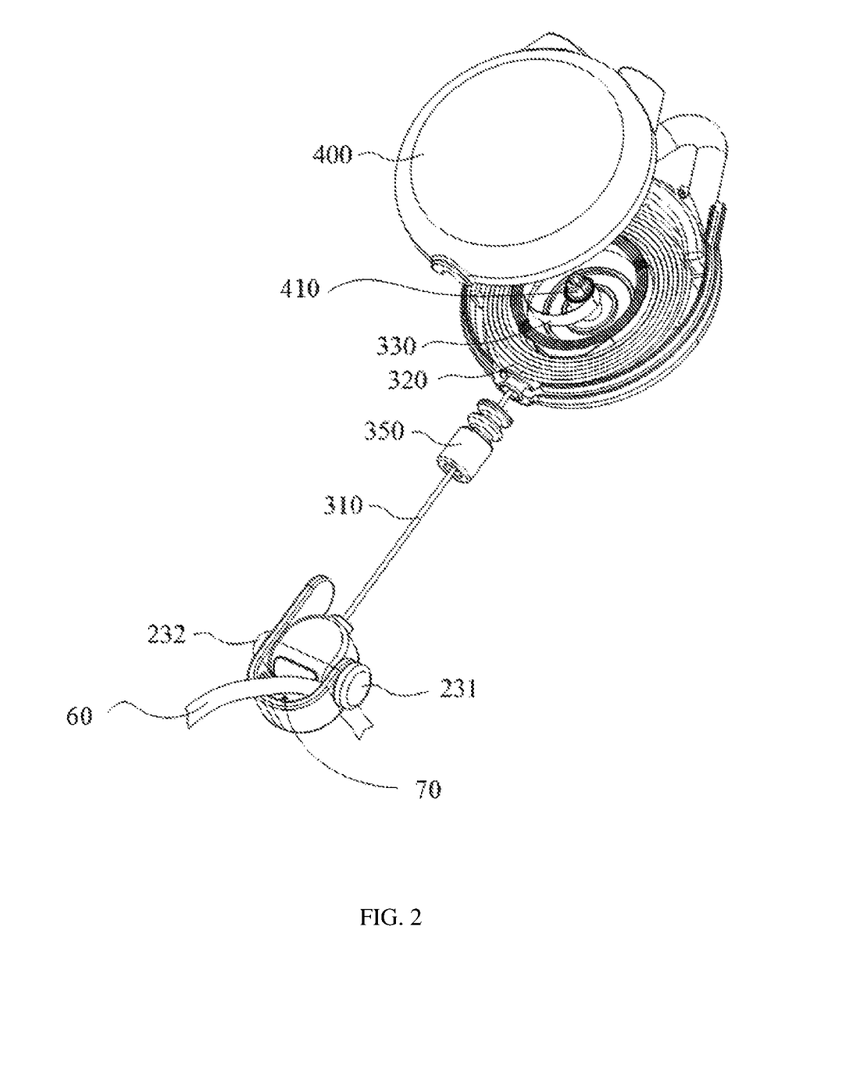
FIG. 2 is a schematic diagram of a split structure of the hooking device of the VR data cable according to an embodiment of this application.

Referring to FIG. 2, in an embodiment, the adjustment assembly 40 includes a pull wire and a spiral elastic piece 330. The pull wire includes a straight section 310 and a winding section 320. One end of the elastic piece 330 located at a spiral center 410 is connected to the buffer 100, and the other end of the elastic piece 330 is connected to the winding section 320. The winding section 320 is spirally wound on an outer circumference of the elastic piece 330. One end of the straight section 310 is connected to an end of the winding section 320 away from the elastic piece 330, and the other end of the straight section 310 is connected to the hang assembly 50. The user will drive the VR data cable 60 to move when using the VR headset. When the VR data cable 60 is pulled, the hang assembly 50 and the straight section 310 connected to the hang assembly 50 will be pulled, so that the spiral structure formed by the winding section 320 and the elastic piece 330 will be driven to shrink, so that part of the winding section 320 is transformed into the straight section 310, thereby reducing the height of the VR data cable 60; and when the force of pulling the VR data cable 60 disappears, the pulling force of the VR data cable 60 to the elastic piece 330 will also disappear, at this time, the elastic piece 330 will relax under the action of its own elastic restoring force, and drive the winding section 320 to also relax, so that part of the straight section 310 is transformed back into the winding section 320, thereby shortening the length of the straight section 310, so that the VR data cable 60 returns to its original height. Utilizing the elastic deformation of the elastic piece 330 to adapt to the height change of the VR data cable 60 makes the height change of the VR data cable 60 more flexible when the user uses the VR data cable 60, thereby making it more convenient for the user to use the VR headset.

In an embodiment, a storage box 400 is provided outside the elastic piece 330 and the winding section 320. The end of the elastic piece 330 located at the spiral center 410 is fixed in the storage box 400, and the buffer 100 is fixed on the storage box 400. The straight section 310 is extended out of the storage box 400 from an end of the storage box 400 away from the buffer 100. On the one hand, the storage box 400 is configured to fix the elastic piece 330 at the spiral center 410, and on the other hand, the storage box 400 is configured to protect the elastic piece 330 and the winding section 320, so that the elastic piece 330 and the winding section 320 are not easily contaminated with dust, so that the deformation process of the elastic piece 330 and the winding section 320 is smoother, and the movement of the VR data cable 60 is more flexible.

Figure 3:
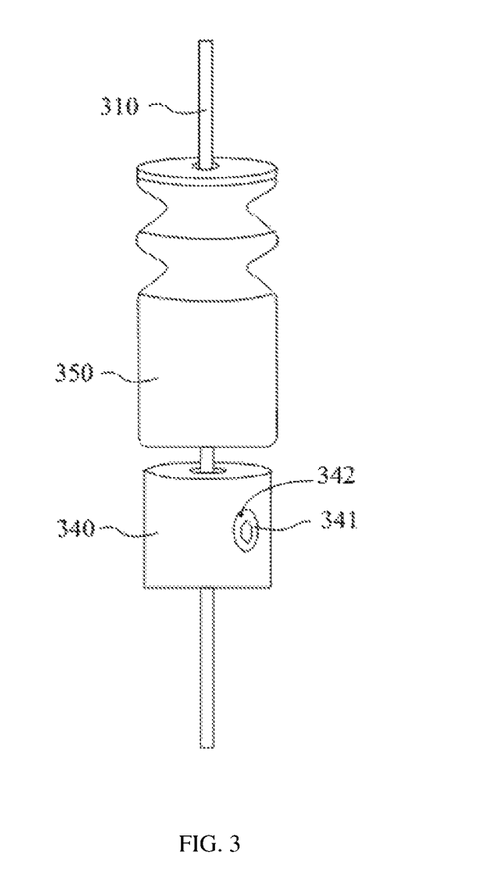
FIG. 3 is a detailed view of a sleeve in the hooking device of the VR data cable of this application.

Referring to FIGS. 1 and 3, in an embodiment, the straight section 310 is sleeved with a sleeve 340. A side wall of the sleeve 340 defines a threaded hole 342 penetrating one side wall of the sleeve 340. The threaded hole 342 is provided with a matching bolt 341, and the bolt 341 is configured to be screwed into the threaded hole 342 to abut the straight section 310 against the other side wall of the sleeve 340. When the bolt 341 is screwed into the threaded hole 342 and is abutted against the straight section 310, a passage on the sleeve 340 through which the pull wire passes is narrowed at the bolt 341, and the straight section 310 is squeezed, making it difficult to move in the passage, that is, the locking state between the sleeve 340 and the straight section 310 may be controlled through the threaded fit between the bolt 341 and the threaded hole 342, so that the user may lock the sleeve 340 in a desired position according to actual needs. When the sleeve 340 is in a locking state, when the straight section 310 is partially retracted into the storage box 400 under the pulling of the elastic piece 330 and the winding section 320, the sleeve 340 will block the straight section 310 from continuing to retract at a preset position, so that a height of the VR data cable 60 when it is not pulled by the user, that is, a preset height of the VR data cable 60, may also be adjusted, thereby adapting to different needs of users.

In an embodiment, the sleeve 340 is covered with a protective cover 350, and the protective cover 350 is made of silicone material, so as to play a buffering effect when the sleeve 340 abuts the storage box 400.

In an embodiment, an end of the protective cover 350 close to the storage box 400 is corrugated. Because the storage box 400 and the sleeve 340 will squeeze the protective cover 350 during the retracting process of the pull wire, the end of the protective cover 350 close to the storage box 400 being corrugated is more conducive to the protective cover 350 to buffer the subjected pressure and prolong the service life of the protective cover 350. One end of the protective cover 350 close to the storage box 400 is sleeved on the pull wire, and the other end of the protective cover 350 is sleeved on the sleeve 340. When the position of the sleeve 340 on the pull wire needs to be adjusted, the protective cover 350 may be pulled to make the sleeve 340 be exposed outside the protective cover 350, so as to facilitate the operation of the bolt 341 and unlock the bolt 341. After the position of the sleeve 340 is adjusted, one end of the protective cover 350 being sleeved outside the sleeve 340 may have a protective effect on the sleeve 340 and the bolt 341, so that the bolt 341 may be locked at the preset position of the pull wire more stably, so that when the user uses the VR headset, the hooking height of the VR data cable 60 is more stable.

In an embodiment, the bolt 341 defines a hexagonal hole extending along an axis direction of the threaded hole 342. A hexagonal wrench may be inserted into the hexagonal hole and turned around an axis of the hexagonal hole to tighten or loosen the bolt 341, so that the lock process and unlock process of the bolt 341 are more convenient.

In an embodiment, the buffer 100 is V-shaped, and the buffer 100 and the storage box 400 are combined to define a hooking space 30 configured to be hooked to the hook 20. When a thread is hung on the hook 20, the thread will form a V shape under its own gravity, and the V shape may change in shape and angle as the thread and the hook 20 slide relative to each other, so that the thread is hung on the hook 20 more stably. In this embodiment, the buffer joint is set in a V shape, so that when the storage box 400 rotates under the drive of the pull wire, the buffer joint may slide on the hook 20 more flexibly without leaving the hook 20, so that during the process of the user using the VR headset, the VR data cable 60 is not easy to slip off the hook 20, so that the VR data cable 60 is not easy to trip people over.

In an embodiment, the hang assembly 50 includes an adapter 210 and a hang member 220. The adapter 210 is connected to the straight section 310. A shaft core 230 is penetrated through the adapter 210. One end of the shaft core 230 extending out of the adapter 210 is provided with a stopper 231, and the other end of the shaft core 230 extending out of the adapter 210 is provided with a clamping block 232. The hang member 220 includes a first end 221 and a second end 222. The first end 221 is sleeved on a part of the shaft core 230 between the stopper 231 and the adapter 210. The second end 222 defines a clamping hole 223, and the second end 222 is configured to be bent to define a hooking hole 70 between the hang member 220 and the adapter 210, then the clamping block 232 is configured to be elastically clamped into the clamping hole 223 to sleeve the second end 222 on a part of the shaft core 230 between the clamping block 232 and the adapter 210. In the process of hanging the VR data cable 60, first remove the second end 222 from the adapter 210, then lay the VR data cable 60 on the hang member 220, and then bend the hang member 220 to make the second end 222 be elastically clamped with the clamping block 232, so that the hang member 220 and the adapter 210 are cooperated and sleeved on the VR data cable 60, which is convenient and quick to operate.

It can be understood that, in this embodiment, when the second end 222 and the clamping block 232 are elastically clamped, the first end 221 and the second end 222 may both rotate around the axis of the shaft core 230, thereby increasing the degree of freedom of movement of the VR data cable 60, so that in the process of the user using VR headset to play VR games, the VR data cable 60 may more freely change the direction and position with the user's actions, so that the user is not easy to be tripped by the VR data cable 60 when using the VR headset.

In an embodiment, the clamping block 232 has a hemispherical shape. In the process of clamping the clamping block 232 into the clamping hole 223, a smaller end of the clamping block 232 first enters the clamping hole 223, and when the clamping block 232 continues to receive the force toward the clamping hole 223, the clamping block 232 will squeeze an edge of the clamping hole 223, causing the edge of the clamping hole 223 to deform, until the clamping block 232 is completely clamped into the clamping hole 223, the edge of the clamping hole 223 is restored and pressed against a peripheral wall of the shaft core 230, so that the clamping process is smooth. When the VR data cable 60 needs to be removed, pull the second end 222 in the opposite direction to separate the clamping block 232 from the clamping hole 223. Because the clamping block 232 is hemispherical, during the process of separating the clamping block 232 from the clamping hole 223, a larger end of the clamping block 232 needs to be pulled out of the clamping hole 223 first, and this process is more difficult than the process of clamping in, so that the clamping block 232 is not easy to automatically leave the clamping hole 223 after clamping-in, that is, during the user's use, the VR data cable 60 is not easy to fall, which further reduces the probability of the user tripping over the VR data cable 60. In other embodiments, the clamping block 232 may be arranged in a spherical or ellipsoidal shape, so that the clamping and separation between the clamping block 232 and the clamping hole 223 are smoother.

In an embodiment, the second end 222 defines a plurality of clamping holes 223, and the plurality of clamping holes 223 are spaced apart along a length of the hang member 220, so that when storing VR data cables 60 of different thicknesses, the size of the hooking hole 70 may be adjusted, so as to expand the scope of application. In addition, adjusting the size of the hooking hole 70 also facilitates the simultaneous storage of multiple VR data cables 60, so that the storage of the VR data cables 60 is more orderly.

In some embodiments, the hang member 220 is a silicone strip. The silicone strip is used to connect the pull wire and the VR data cable 60, which not only serves as a connection but also serves as a buffer to reduce the wear on the VR data cable 60, and further reduce the noise generated by the VR data cable 60 during use.

Figure 4:
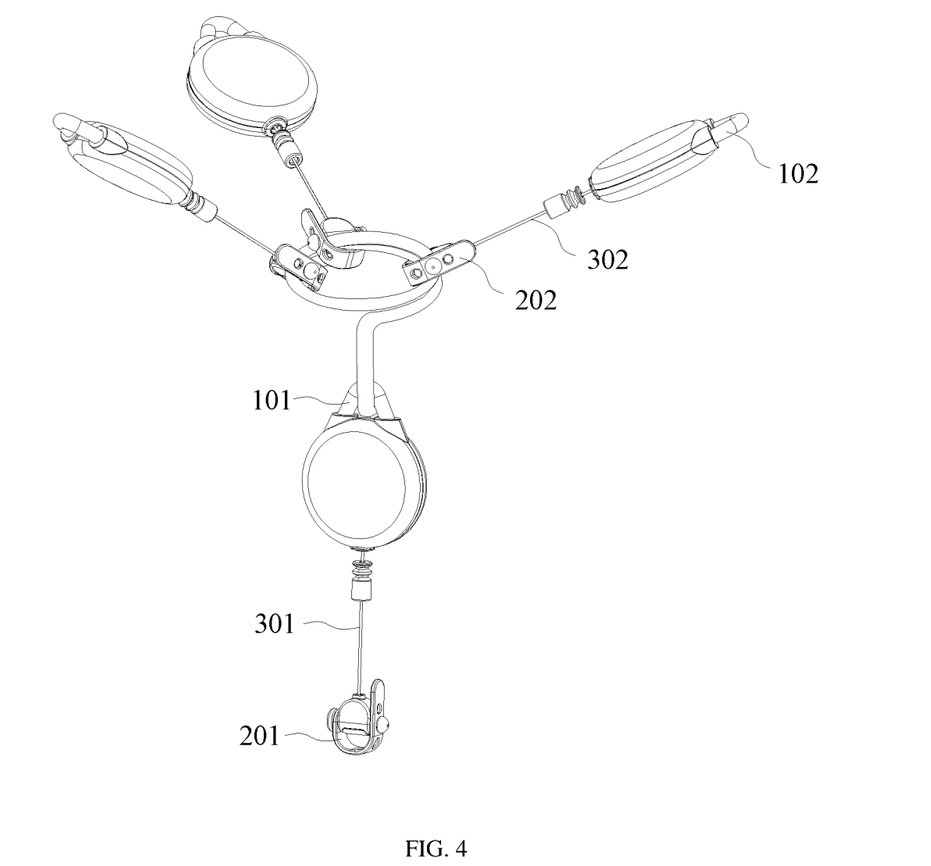
FIG. 4 is a schematic structural diagram of the hooking device of the VR data cable according to another embodiment of this application.

Referring to FIG. 4, this application further provides a hooking device of a VR data cable 60, which includes the above-mentioned buffer 100, hang assembly 50 and adjustment assembly 40. The specific structures of the buffer 100, the hang assembly 50 and the adjustment assembly 40 may refer to the above embodiments. Since the hooking device of the VR data cable 60 adopts all the technical solutions of all the above-mentioned embodiments, it has at least all the beneficial effects brought by the technical solutions of the above-mentioned embodiments, which will not be described in detail here.

Where, the hang assembly 50 includes a first hang section 201 and a second hang section 202, and the adjustment assembly 40 includes a first adjustment section 301 and a second adjustment section 302. A second buffer section 102, a second adjustment section 302, and a second hang section 202 are hung on the hook 20 of the ceiling 10 in sequence. A first buffer section 101, the first adjustment section 301, and the first hang section 201 are hung on the second hang section 202 in sequence. The first hang section 201 is configured to hang the VR data cable 60, and the adjustment assembly 40 adjusts the hang height of the VR data cable 60 through elastic expansion and contraction. The first adjustment section 301 and the second adjustment section 302 are provided to increase the adjustment range of the hooking device of the VR data cable 60, making it more convenient for users to use.

In an embodiment, a number of the second buffer section 102, a number of the second adjustment section 302, and a number of the second hang section 202 are multiple and equal. The multiple second buffer sections 102 are hung on hooks 20 of the ceiling 10 at intervals, and the first buffer section 101 is simultaneously connected with the multiple second hang sections 202. The cooperation of the first buffer section 101, the first adjustment section 301 and the first hang section 201 with the plurality of second buffer sections 102, the plurality of second adjustment section 302 and the plurality of second hang section 202 increases the degree of freedom of movement of the pull wire of the hooking device of the VR data cable 60, which further increases the degree of freedom of movement of the VR data cable 60 finally hooked to the first hooking device of the VR data cable 60, thereby making the user more convenient to use. In addition, the cooperation of the first hooking device of the VR data cable 60 and the second hooking device of the VR data cable 60 enables the hooking device of the VR data cable 60 to be applied in an environment with a higher ceiling 10.

In an embodiment, the number of the second buffer section 102, the number of the second adjustment section 302, and the number of the second hang section 202 are all three, three second buffer sections 102 are hung on the hooks 20 of the ceiling 10 in a triangular distribution, and the first buffer section 101 is simultaneously connected with the multiple second hang sections 202. The triangular distribution of the three second buffer sections 102 makes the structure of the second hooking device of the VR data cable 60 more stable, so that when the first hooking device of the VR data cable 60 is pulled by the VR data cable 60, the second hooking device of the VR data cable 60 may more stably support the first hooking device of the VR data cable 60.

The above are only the optional embodiments of this application, and therefore do not limit the patent scope of this application. Under the conception of this application, any equivalent structural transformation made by using the content of the description and drawings of this application, or direct/indirect application in other related technical fields are all included in the patent protection scope of this application.

What is claimed is:

1. A hooking device of a VR data cable, configured to hang the VR data cable, comprising:
   a buffer, hung on a hook of a ceiling;
   a hang assembly, configured to hang the VR data cable; and,
   an adjustment assembly, one end of the adjustment assembly being connected to the buffer, the other end of the adjustment assembly being connected to the hang assembly, a hang height of the VR data cable being adjusted through elastic expansion and contraction of the adjustment assembly.

2. The hooking device of the VR data cable of claim 1, wherein the adjustment assembly comprises a pull wire and a spiral elastic piece, the pull wire comprises a straight section and a winding section, one end of the elastic piece located at a spiral center is connected to the buffer, the other end of the elastic piece is connected to the winding section, the winding section is spirally wound on an outer circumference of the elastic piece, one end of the straight section is connected to an end of the winding section away from the elastic piece, and the other end of the straight section is connected to the hang assembly.

3. The hooking device of the VR data cable of claim 2, wherein a storage box is provided outside the elastic piece and the winding section, the end of the elastic piece located at the spiral center is fixed in the storage box, the buffer is fixed on the storage box, and the straight section is extended out of the storage box from an end of the storage box away from the buffer.

4. The hooking device of the VR data cable of claim 3, wherein the straight section is sleeved with a sleeve, a side wall of the sleeve defines a threaded hole penetrating one side wall of the sleeve, the threaded hole is provided with a matching bolt, and the bolt is configured to be screwed into the threaded hole to abut the straight section against the other side wall of the sleeve.

5. The hooking device of the VR data cable of claim 4, wherein the buffer, the adjustment assembly and the hang assembly are sequentially connected to form one hooking group, and a number of the hooking group is at least two, the buffer of one of the at least two hooking groups is hooked on the hang assembly of others of the at least two hooking groups, the hang assembly of the one of the at least two hooking groups is configured to hang the VR data cable, and the buffer of the others of the at least two hooking groups is hung on the hook of the ceiling.

6. The hooking device of the VR data cable of claim 3, wherein the buffer is V-shaped and combined with the storage box to define a hooking space configured to be hooked to the hook.

7. The hooking device of the VR data cable of claim 6, wherein the buffer, the adjustment assembly and the hang assembly are sequentially connected to form one hooking group, and a number of the hooking group is at least two, the buffer of one of the at least two hooking groups is hooked on the hang assembly of others of the at least two hooking groups, the hang assembly of the one of the at least two hooking groups is configured to hang the VR data cable, and the buffer of the others of the at least two hooking groups is hung on the hook of the ceiling.

8. The hooking device of the VR data cable of claim 3, wherein the buffer, the adjustment assembly and the hang assembly are sequentially connected to form one hooking group, and a number of the hooking group is at least two, the buffer of one of the at least two hooking groups is hooked on the hang assembly of others of the at least two hooking groups, the hang assembly of the one of the at least two hooking groups is configured to hang the VR data cable, and the buffer of the others of the at least two hooking groups is hung on the hook of the ceiling.

9. The hooking device of the VR data cable of claim 2, wherein the hang assembly comprises an adapter and a hang member, the adapter is connected to the straight section, a shaft core is penetrated through the adapter, one end of the shaft core extending out of the adapter is provided with a stopper, the other end of the shaft core extending out of the adapter is provided with a clamping block, the hang member comprises a first end and a second end, the first end is sleeved on a part of the shaft core between the stopper and the adapter, the second end defines a clamping hole, the second end is configured to be bent to define a hooking hole between the hang member and the adapter, the clamping block is configured to be elastically clamped into the clamping hole to sleeve the second end on a part of the shaft core between the clamping block and the adapter.

10. The hooking device of the VR data cable of claim 9, wherein the second end defines a plurality of clamping holes spaced apart along a length direction of the hang member.

11. The hooking device of the VR data cable of claim 10, wherein the buffer, the adjustment assembly and the hang assembly are sequentially connected to form one hooking group, and a number of the hooking group is at least two, the buffer of one of the at least two hooking groups is hooked on the hang assembly of others of the at least two hooking groups, the hang assembly of the one of the at least two hooking groups is configured to hang the VR data cable, and the buffer of the others of the at least two hooking groups is hung on the hook of the ceiling.

12. The hooking device of the VR data cable of claim 9, wherein the buffer, the adjustment assembly and the hang assembly are sequentially connected to form one hooking group, and a number of the hooking group is at least two, the buffer of one of the at least two hooking groups is hooked on the hang assembly of others of the at least two hooking groups, the hang assembly of the one of the at least two hooking groups is configured to hang the VR data cable, and the buffer of the others of the at least two hooking groups is hung on the hook of the ceiling.

13. The hooking device of the VR data cable of claim 2, wherein the buffer, the adjustment assembly and the hang assembly are sequentially connected to form one hooking group, and a number of the hooking group is at least two, the buffer of one of the at least two hooking groups is hooked on the hang assembly of others of the at least two hooking groups, the hang assembly of the one of the at least two hooking groups is configured to hang the VR data cable, and the buffer of the others of the at least two hooking groups is hung on the hook of the ceiling.

14. The hooking device of the VR data cable of claim 1, wherein the buffer, the adjustment assembly and the hang assembly are sequentially connected to form one hooking group, and a number of the hooking group is at least two, the buffer of one of the at least two hooking groups is hooked on the hang assembly of others of the at least two hooking groups, the hang assembly of the one of the at least two hooking groups is configured to hang the VR data cable, and the buffer of the others of the at least two hooking groups is hung on the hook of the ceiling.

* * * * *